United States Patent
Caldana

(10) Patent No.: US 6,796,467 B2
(45) Date of Patent: Sep. 28, 2004

(54) DEVICE FOR THE QUICK AND EASY USE OF A SMALL SIZE CELLULAR TELEPHONE

(75) Inventor: Marcus Caldana, Bologna (IT)

(73) Assignee: Franco Caldana (IT)

( * ) Notice: Subject to any disclaimer, the term of this patent is extended or adjusted under 35 U.S.C. 154(b) by 0 days.

(21) Appl. No.: 10/203,372

(22) PCT Filed: Feb. 9, 2001

(86) PCT No.: PCT/EP01/01433
§ 371 (c)(1),
(2), (4) Date: Aug. 9, 2002

(87) PCT Pub. No.: WO01/61970
PCT Pub. Date: Aug. 23, 2001

(65) Prior Publication Data
US 2003/0019894 A1 Jan. 30, 2003

(30) Foreign Application Priority Data
Feb. 18, 2000 (IT) ........................... GE2000A0020

(51) Int. Cl.⁷ .................................................. A45F 3/14
(52) U.S. Cl. .......................... 224/219; 224/165; 224/930
(58) Field of Search .............................. 224/219, 221, 224/242, 267, 930, 587, 165

(56) References Cited

U.S. PATENT DOCUMENTS

| | | | | |
|---|---|---|---|---|
| 1,906,870 A | * | 5/1933 | Palla | ............................. 42/94 |
| 2,854,132 A | * | 9/1958 | Bjerknes et al. | ........... 70/456 R |
| 3,060,625 A | * | 10/1962 | Glass et al. | .................... 446/26 |
| 5,309,328 A | * | 5/1994 | Lum | ............................ 361/809 |
| 5,467,324 A | * | 11/1995 | Houlihan | ...................... 368/10 |
| 5,657,201 A | * | 8/1997 | Kochis | ......................... 361/686 |
| 2003/0164389 A1 | * | 9/2003 | Byers | .......................... 224/221 |

FOREIGN PATENT DOCUMENTS

EP    0871236 A2 * 10/1998
JP    WO99/59314    * 11/1999

* cited by examiner

Primary Examiner—Stephen K. Cronin
(74) Attorney, Agent, or Firm—Stites & Harbison PLLC; Marvin Petry

(57) ABSTRACT

The small size cellular telephone (T) is fixed on a telescopic slide (201, 101) sliding on a guide (1) which can be longitudinally secured on the user's arm (B), at the wrist (P). When the cellular telephone calls and has the vibration signaller warning system activated, the vibrations are easily transmitted to the slides and guide system and from this last to the user's wrist who can this way instantaneously notice the call state, even if he is in a noisy place. By catching the cellular telephone with the free hand, the user can extend the guides and quickly bring the cellular telephone itself to the palm of the hand to use it. When the conversation is over, the cellular telephone can be as well quickly taken back to the backward rest position on the wrist. Suitable release means are provided to keep the slides in the backward rest position and if required also in the extended use position of the cellular telephone.

12 Claims, 2 Drawing Sheets

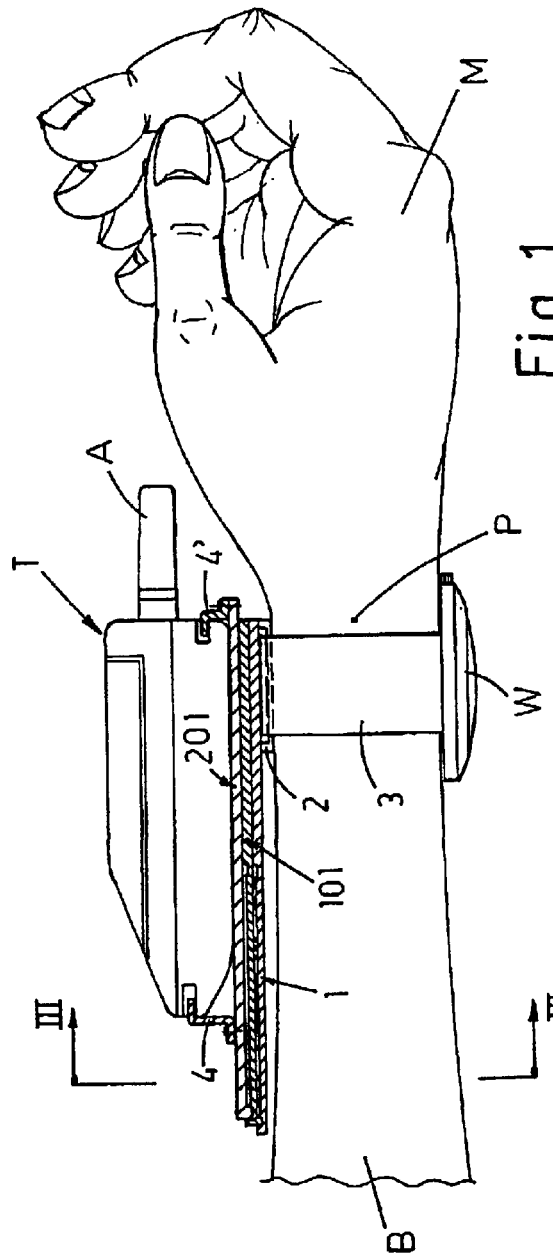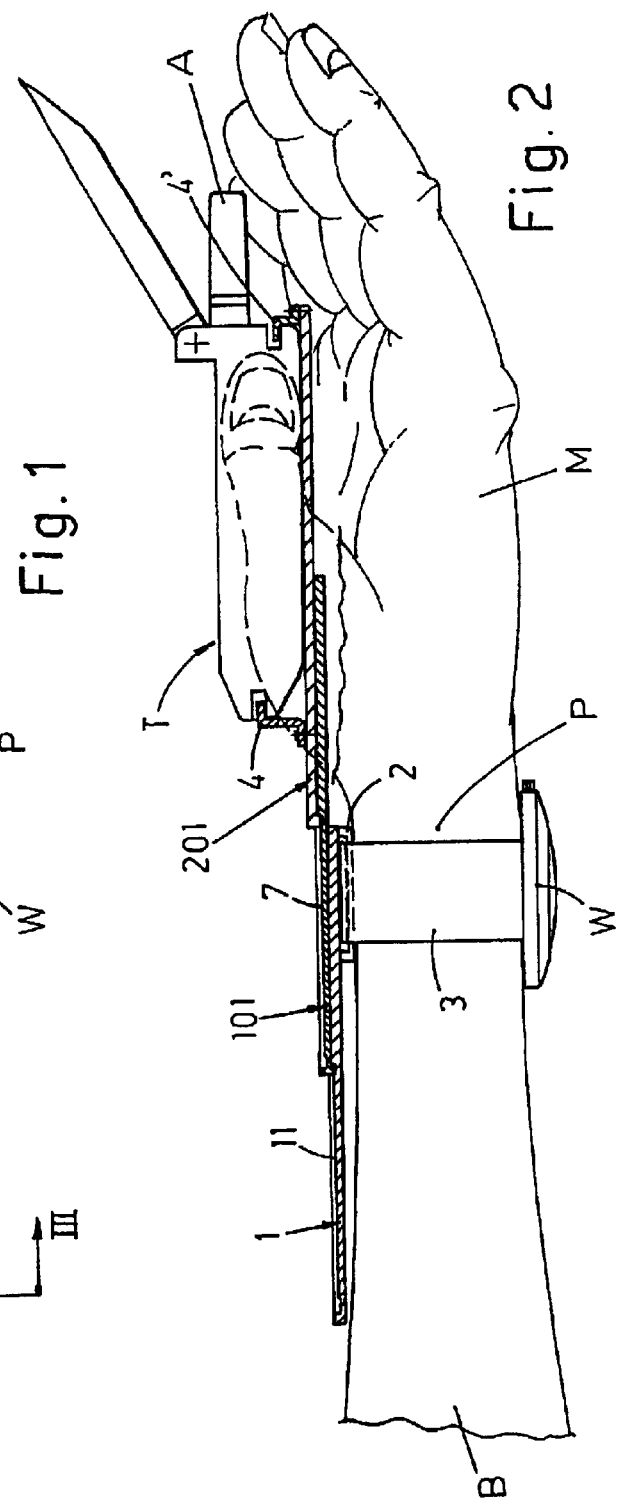

DEVICE FOR THE QUICK AND EASY USE OF A SMALL SIZE CELLULAR TELEPHONE

In order to carry about, for the user, cellular telephones or mobile phones, there are actually different types of cases which the user can wear for example at the belt or over one shoulder. No one of the devices actually known allows the possibility of quickly and easily setting the cellular telephone to its use condition and then as well quickly and easily setting it back to rest, and no one of the known devices allows to carry the cellular telephone in such a position to allow the user to hear a call, particularly in presence of great noise. The invention intends to solve these and other problems through the following solution idea. The small size cellular telephone is fixed on a telescopic slide sliding on a guide longitudinally to be secured at the wrist of the arm of the user. In this position, when the cellular telephone receives a call and has the vibration signaller warning system activated, the vibrations are easily transmitted to the slides and guide system and from this latter to the wrist of the user who can this way instantaneously notice the call state, even in a noisy place. By catching the cellular telephone with the free hand, the user can extend the guides and quickly bring the cellular telephone to the palm of the hand to use it. When the conversation is over, the cellular telephone can be as well quickly taken back to the backward rest position on the wrist. Suitable means are provided to keep the slides in the backward rest position and if required also in the extended use position of the cellular telephone. Further features of the invention and the advantages deriving therefrom, will better appear from the following description of a preferred embodiment of same, illustrated, by way of non-limiting example, in the figures of the attached sheets of drawings, in which:

FIGS. 1 and 2 show the device in question, longitudinally sectioned, fixed to the user's wrist, and shown respectively in the cellular telephone rest position and use position;

Figure 3:
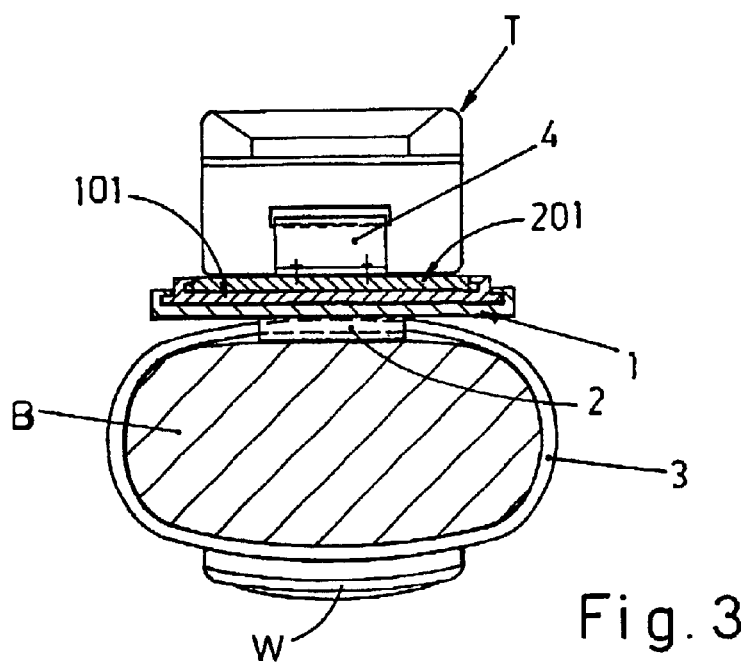
FIG. 3 shows further details of the device taken along the transversal section line III—III of FIG. 1.
Figure 5:
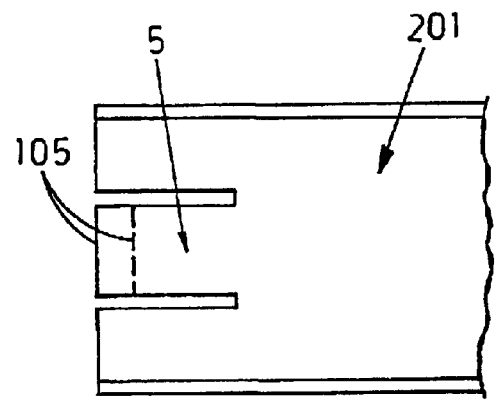
FIG. 5 shows in plan view the rear end of the upper slide of the device as from the details of FIG. 4.
Figure 4:
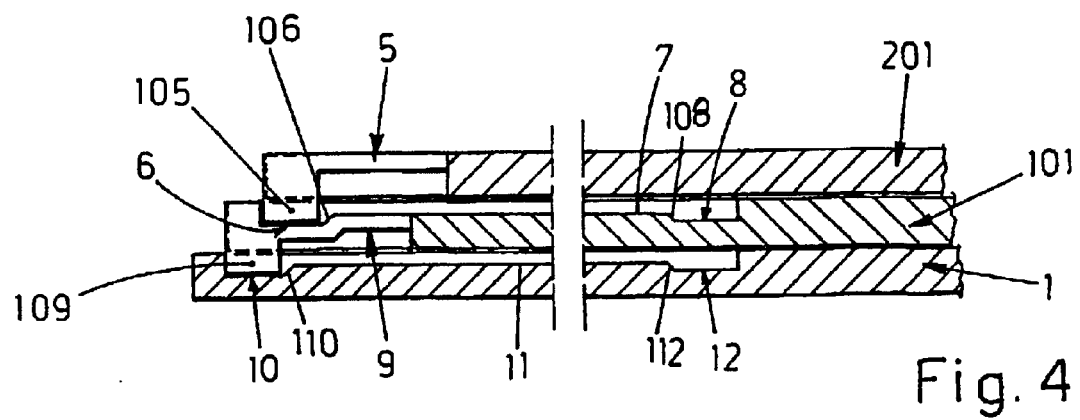
FIG. 4 shows, enlarged and longitudinally sectioned, the assembly of the guide and telescopic slides, shown in the backward rest position as in FIG. 1.

From FIGS. 1, 2 and 3 it can be appreciated that the device includes a rectilinear guide 1, flat shaped and provided at one end on its lower part with any means adapted to be secured longitudinally on the arm B of the user, at the wrist P. For this purpose the guide 1 can be provided on its lower part with a loop 2 passed through by a strap 3 encircling the users wrist P. The strap 3 can be the same one which, in opposition with the guide 1, retains the wrist watch W. It is understood that differently from what shown, the guide 1 can have on its lower part an anatomic shape and/or can be suitably padded to be worn at the wrist without any problem. Viewed transversally as from FIG. 3, the guide 1 has for example a dovetail shape and has a slide 101 sliding longitudinally which in its turn has a transversal dovetail shape and serves as guide for a further flat slide 201 on which there is fixed with longitudinal setting the cellular telephone T, for example by means of small clips 4, 4' engaging grooved zones at the ends of the cellular telephone itself. The cellular telephone has the aerial A turned towards the user's hand. From FIG. 1 it can be noticed that when the device is in a rest. i.e., retracted position, the slides 101, 201 are superimposed one onto the other and with respect to the guide 1 and the cellular telephone is in a backward or retracted position allowing the user the free use of the hand M. When the cellular telephone calls and has the vibration signaller activated, the vibrations are transmitted to the assembly 1, 101, 201 and from this to the wrist P, so that the user can notice the call state even if he is in a noisy place. From FIG. 2 instead, it becomes clear how by taking the cellular telephone T out with the free hand and making the slide assembly 201, 101 slide on the guide 1, the same cellular telephone T comes to be arranged in the palm of the hand M, into an extended position suitable to use it quickly and easily. With a movement as well quick and easy the cellular telephone can be brought to the rest or retracted position of FIG. 1. With reference to FIGS. 4 and 5 is now evidenced in detail one possible embodiment of the assembly 1, 101, 201. From said figures it can be noticed that the slide 201 is provided on the rear end not engaged by the cellular telephone, with a flexible tongue 5 which has a tab such as tooth 105 turned downwards and when the same slide 201 is in the backward rest (i.e., retracted) position, said tooth 105 snaps in a small recess 6 provided on the rear end of the slide 101, at the end of a longitudinal groove 7 of the same slide 101. Pulling longitudinally the slide 201, the tooth 105 co-operates with the flared inner edge 106 of the recess 6 and easily gets out of (i.e., disengages) said recess, while the tongue 5 bends. The tooth 105 then slips on the bottom of the groove 7 and finally snaps into a recess 8 identical and opposed to the recess 6 mentioned above. Keeping the longitudinal pull on the slide 201, its tooth 105 which has reached the end of the groove 7, drags the slide 101 below making it slide on the guide 1. Also the slide 101 is provided in the rear part with a flexible tongue 9, analogous to the tongue 5, whose tooth 109 gets out of a recess 10, analogous to the recess 6 and slides in a longitudinal groove 11, analogous to the groove 7, at whose end it is provided a recess 12, analogous to the recess 8, where said tooth 109 snaps. It is then clear how the slide assembly 101, 201 steadily remains in the backward rest (i.e., retracted) position thanks to the co-operation of the teeth 105 and 109 with the recesses 6 and 10 and how, on the contrary, it steadily remains in the extended position thanks to the co-operation of the same teeth 105 and 109 with the recesses 8 and 12. Reference numerals 108, 110, 112 indicate the flared inner edges of the recesses 8, 10, 12, analogous to the edge 106 of the recess 6.

What is claimed is:

1. A device for the quick and easy use of a small size cellular telephone and attachable to a user's arm proximate the user's wrist and hand, said device comprising:

a rectilinear guide fixable to a user's arm proximate the user's wrist and having a guide dovetail portion;

an assembly comprising a plurality of slides, said plurality of slides telescopically arranged with one another, said assembly having a complementary dovetail portion to said guide dovetail portion for slidingly engaging with said rectilinear guide, said assembly having a retracted position and an extended position relative to said guide, a last one of said plurality of slides accommodating a longitudinally disposed cellular telephone where an aerial of said cellular telephone extends towards the user's hand; and each of said plurality of slides having a tab which slidingly engages in a longitudinal groove of an adjacent one of said plurality of slides, said tab being disengageably lockable in said longitudinal groove to thereby maintain a respective said slide in an extended position relative to said adjacent slide or in a retracted position relative to said adjacent slide.

2. The device according to claim 1, further comprising at least one clip on said last one of said plurality of slides to attach the cellular telephone to said assembly.

3. The device of claim 1, wherein said longitudinal groove comprises two recesses to which said tab disengageably locks to thereby maintain the respective said slide in the extended position or the retracted position, respectively.

4. The device of claim 3, wherein one of an edge of one of said tabs or an inner edge of the corresponding recess is flared to help with disengagement of said tab from said corresponding recess.

5. The device of claim 1, further comprising a strap for attaching said device to the user's wrist.

6. The device according to claim 5, wherein said strap is adapted for attaching to a watch.

7. A device for the quick and easy use of a small size cellular telephone and attachable to a user's arm proximate the user's wrist and hand, said device comprising:

a rectilinear guide fixable to a user's arm proximate the user's wrist;

an assembly comprising a plurality of slides, telescopically arranged with one another, said assembly slidingly engaging with said rectilinear guide, said assembly having a retracted position and an extended position relative to said guide, a last one of said plurality of slides accommodating a longitudinally disposed cellular telephone where an aerial of said cellular telephone is extends towards the user's hand;

each of said slides having a tab which slidingly engages in a longitudinal groove of an adjacent one of the plurality of slides, said tab being disengageably lockable in said longitudinal groove to thereby maintain a respective said slide in an extended position relative to said adjacent slide or in a retracted position relative to said adjacent slide; and at least one clip on said last one of said plurality of slides to attach the cellular telephone to said assembly.

8. The device according to claim 7, wherein said guide and said assembly have complementary dovetail portions for slidingly engaging with one another.

9. The device of claim 7, whereby said longitudinal groove comprises two recesses to which said tab disengageably locks to thereby maintain the respective said slide in the extended position or the retracted position, respectively.

10. The device of claim 9, wherein one of an edge of one of said tabs or an inner edge of the corresponding recess is flared to help with disengagement of said tab from said corresponding recess.

11. The device of claim 7, further comprising a strap for attaching said device to the user's wrist.

12. The device of claim 11, wherein said strap is adapted for attaching to a watch.

* * * * *